(12) United States Patent
Husband et al.

(10) Patent No.: US 8,378,537 B2
(45) Date of Patent: Feb. 19, 2013

(54) SUPERCONDUCTING ELECTRICAL MACHINE

(75) Inventors: Stephen M Husband, Derby (GB);
Alexander C Smith, Holmfirth (GB);
Stephen Williamson, Huddersfield (GB)

(73) Assignee: Rolls-Royce PLC, London (GB)

( * ) Notice: Subject to any disclaimer, the term of this patent is extended or adjusted under 35 U.S.C. 154(b) by 341 days.

(21) Appl. No.: 12/742,952

(22) PCT Filed: Oct. 28, 2008

(86) PCT No.: PCT/GB2008/003656
§ 371 (c)(1),
(2), (4) Date: Jun. 3, 2010

(87) PCT Pub. No.: WO2009/068844
PCT Pub. Date: Jun. 4, 2009

(65) Prior Publication Data
US 2010/0244596 A1      Sep. 30, 2010

(30) Foreign Application Priority Data
Nov. 27, 2007   (GB) .................................. 0723149.1

(51) Int. Cl.
*H02K 9/00* (2006.01)
(52) U.S. Cl. ............................................ 310/64; 310/52
(58) Field of Classification Search .............. 310/52, 310/54, 57, 59, 64
See application file for complete search history.

(56) References Cited

U.S. PATENT DOCUMENTS

| | | | |
|---|---|---|---|
| 3,764,835 A * | 10/1973 | Luck et al. ...................... | 310/52 |
| 3,772,543 A * | 11/1973 | Woodson ........................ | 310/52 |
| 4,862,023 A | 8/1989 | Laumond et al. | |
| 5,030,863 A * | 7/1991 | Yoshimura et al. ............. | 310/52 |
| 6,366,000 B1 * | 4/2002 | Higashino et al. ............. | 310/260 |
| 7,049,717 B2 * | 5/2006 | Frank et al. ..................... | 310/61 |
| 2008/0161189 A1 * | 7/2008 | Lewis et al. .................... | 505/121 |

FOREIGN PATENT DOCUMENTS

| | | |
|---|---|---|
| DE | 198 04 208 A1 | 8/1999 |
| DE | 10 2005 058 031 A1 | 6/2007 |
| EP | 0 223 107 A1 | 5/1987 |
| EP | 0 349 801 A2 | 1/1990 |
| EP | 1 526 586 A2 | 4/2005 |
| FR | 2 215 740 A1 | 8/1974 |
| FR | 2 514 965 A1 | 4/1983 |
| GB | 2 417 140 A | 2/2006 |
| JP | A-60-148348 | 8/1985 |
| WO | WO 02/063751 A1 | 8/2002 |

OTHER PUBLICATIONS

Apr. 23, 2009 International Search Report issued in PCT/GB2008/003656.
Mar. 12, 2008 Search Report issued in GB 0723149.1.
Apr. 23, 2009 Written Opinion of the International Searching Authority issued in PCT/GB2008/003656.

* cited by examiner

*Primary Examiner* — Dang Le
(74) *Attorney, Agent, or Firm* — Oliff & Berridge, PLC

(57) ABSTRACT

A superconducting electrical machine includes a rotor and a stator. The stator includes a stator having a plurality of circumferentially spaced radially extending teeth and a plurality of superconducting electric coils. Each superconducting electric coil is positioned around a respective one of the teeth. A thermally conducting member surrounds and contacts the stator. A cooler is arranged to cool the thermally conducting member. A vacuum enclosure encloses the thermally conducting member, the stator and the superconducting electric coils and a pump is arranged to evacuate the vacuum enclosure. The superconducting electrical coils include magnesium diboride.

14 Claims, 2 Drawing Sheets

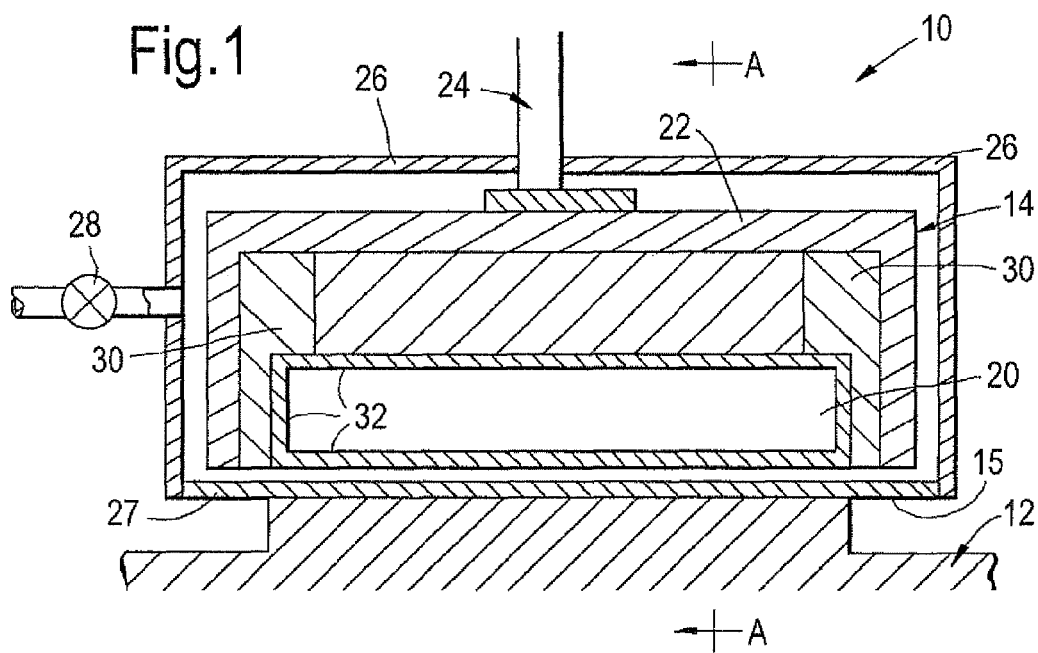
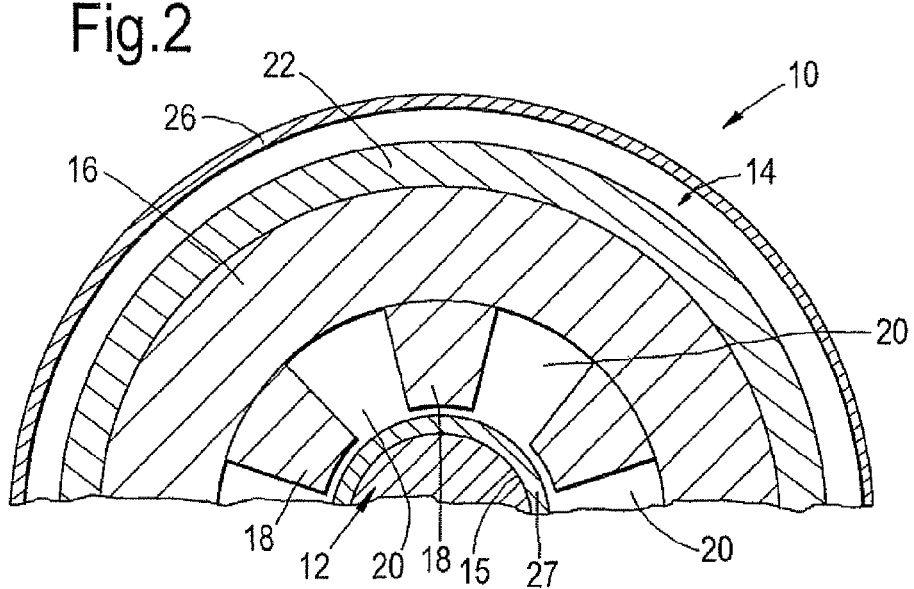

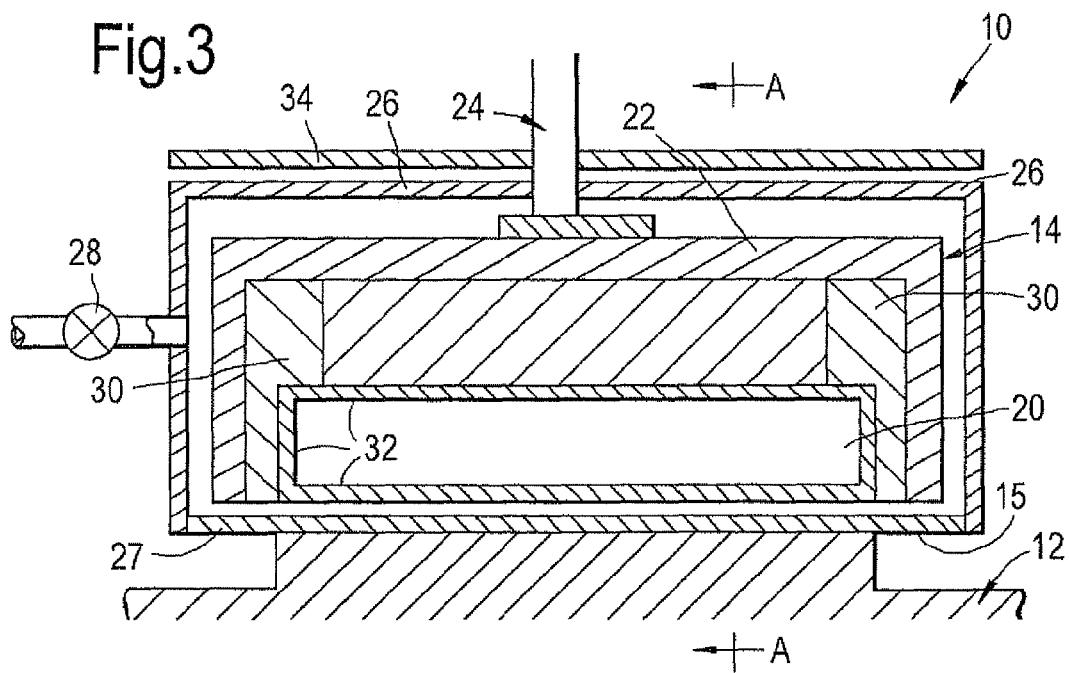
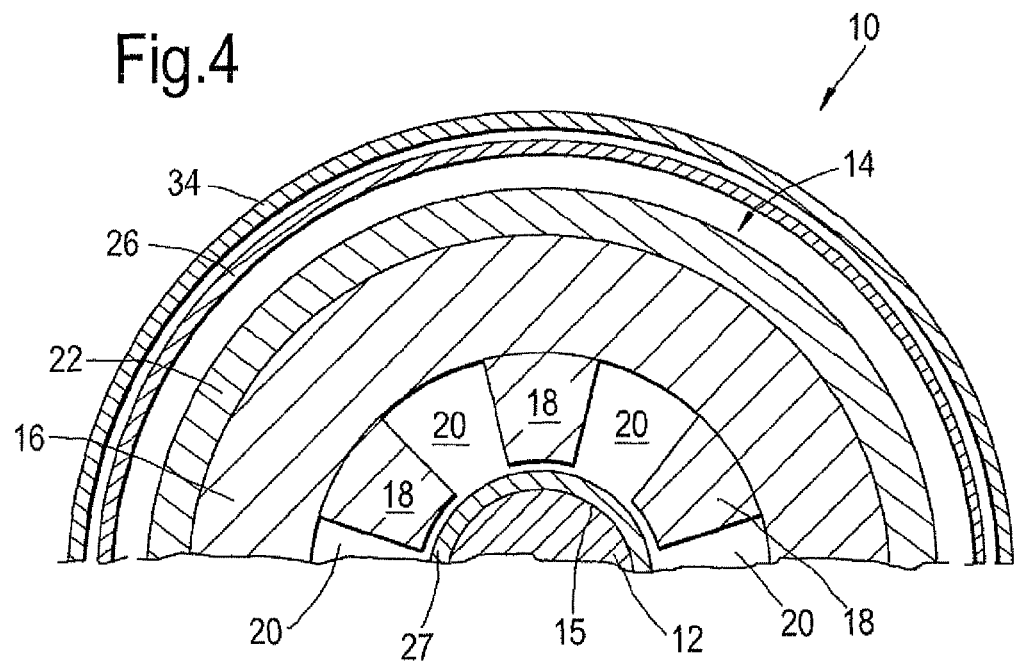

SUPERCONDUCTING ELECTRICAL MACHINE

The present invention relates to superconducting electrical machines.

A superconducting electrical machine enables an increase in the electric and magnetic loadings compared to a conventional electrical machine. A superconducting electrical machine may be smaller, lighter in weight and more efficient than a conventional electrical machine.

The most important factor in the design of a superconducting electrical machine is the air gap between the superconducting wires and the rotor iron. The air gap affects the performance and the type of electrical machine which may be considered. An electrical machine with a magnetised rotor enables the use of larger air gaps, whereas induction or switched reluctance machines require smaller air gaps.

A superconducting electrical machine requires some form of cooling system to enable operation at superconducting conditions, so the affect the cooling system has on the air gap between the stator and the rotor may effect the selection of the type of superconducting electrical machine.

Accordingly the present invention seeks to provide a novel superconducting electrical machine.

Accordingly the present invention provides a superconducting electrical machine comprising a rotor and a stator, the stator comprising a plurality of circumferentially spaced radially extending teeth, a plurality of superconducting electric coils, each superconducting electric coil being positioned around a respective one of the teeth, a thermally conducting member surrounding and contacting the stator, a cooler being arranged to cool the thermally conducting member, a vacuum enclosure enclosing the thermally conducting member, the stator and the superconducting electric coils and a pump to evacuate the vacuum enclosure and wherein the superconducting electric coils comprising magnesium diboride.

Preferably a portion of the vacuum enclosure extending between the rotor and the stator iron.

Alternatively rotating vacuum seals being provided between the rotor and the vacuum enclosure.

Preferably the axial ends of the stator iron being supported in a support structure.

Preferably the support structure comprising a non-magnetic and thermally conducting support structure.

Preferably the support structure comprising alumina.

Preferably the thermally conducting member comprising copper.

Preferably the vacuum enclosure comprising non magnetic and non electrically conducting material.

Preferably the cooler comprising a cryogenic cooling system having a cold head interface with the thermally conducting member.

Alternatively the thermally conducting member having passages extending therethrough and the cooler comprising a Stirling engine providing a flow of cryogenic cooling fluid through the passages in the thermally conducting member.

Preferably the cryogenic cooling fluid comprises liquid neon or liquid helium.

The electrical machine may be a permanent magnet electrical machine, a switched reluctance electrical machine or an induction machine.

The stator may comprise a stator iron. Alternatively the stator may comprise a non magnetic material, e.g. alumina. An iron member may surround the vacuum enclosure.

The present invention will be more fully described by way of example with reference to the accompanying drawings in which:—

FIG. 1 is a longitudinal cross-sectional view through one half of a superconducting electrical machine according to the present invention.

FIG. 2 is a cross-sectional view in the direction of arrows A-A in FIG. 1.

FIG. 3 is a longitudinal cross-sectional view through one half of an alternative superconducting electrical machine according to the present invention.

FIG. 4 is a cross-sectional view in the direction of arrows B-B in FIG. 3.

A superconducting electrical machine 10, as shown in FIGS. 1 and 2 comprises a rotor 12 and a stator 14. The rotor 12 is generally cylindrical and is provided with a plurality of equi-circumferentially spaced permanent magnets or equi-circumferentially spaced salient poles or squirrel cage structure. The stator 14 has a generally cylindrical bore 15 extending there-through. The rotor 12 is arranged coaxially in the generally cylindrical bore 15 through the stator 14. The stator 14 comprises a plurality of circumferentially spaced radially inwardly extending teeth 18 and a plurality of superconducting electric coils 20. Each superconducting electric coil 20 is positioned around a respective one of the teeth 18. A thermally conducting member 22 surrounds and contacts the stator 14. A cooler 24 is arranged to cool the thermally conducting member 22. A vacuum enclosure 26 encloses the thermally conducting member 22, the stator 14 and the superconducting electric coils 20. A pump 28 is arranged to evacuate the vacuum enclosure 26.

It is to be noted that a portion 27 of the vacuum enclosure 26 extends into the bore 15 through the stator 14 and the portion 27 of the vacuum enclosure 26 is annular and is positioned radially between the rotor 12 and the stator 14. Alternatively rotating vacuum seals may be provided between the rotor 12 and the vacuum enclosure 26.

In this arrangement the axial ends of the stator 14 are supported in a support structure 30. The support structure 30 comprises a non-magnetic and thermally conducting support structure, for example the support structure comprises alumina. The support structure 30 provides mechanical support to the end turns of the superconducting electric coils 20 and provides thermal cooling of the end turns of the superconducting electric coils 20.

The superconducting electric coils 20 comprise magnesium diboride wires and the magnesium diboride wires are individually electrically insulated and are potted in an epoxy resin 32 or a hydrocarbon material, which forms a cement at cryogenic temperatures. The epoxy resin 32 or hydrocarbon material provides electrical insulation at higher voltages.

The thermally conducting member 22 comprises copper or other thermally conducting material e.g. aluminium.

The vacuum enclosure 26 comprises non magnetic and non electrically conducting material.

The cooler 24 comprises a cryogenic cooling system having a cold head interface with the thermally conducting member 22, a liquid or gaseous cryogen is used to cool the cold head and such cryogenic cooling systems are well known to a person skilled in the art. The cold head generally comprises a copper cold head. Alternatively the thermally conducting member 22 may have passages extending there-through and the cooler 24 comprises a Stirling engine providing a flow of a cryogenic fluid, a liquid or gaseous cryogen for example liquid neon, gaseous neon, gaseous helium or liquid helium, through the passages in the thermally conducting member 22.

The complete stator assembly is in direct thermal contact and provides a heat capacity, which reduces the thermal impact of any transient temperature conditions.

The superconducting electrical machine 10 may be a permanent magnet electrical machine, a switched reluctance electrical machine or an induction machine.

The use of a multi-phase superconducting AC stator winding using a magnesium diboride wire operating at a temperature exceeding 20K significantly reduces the disadvantages of prior art superconducting electrical machines and enables an improved stator arrangement. It is to be noted that magnesium diboride has a critical temperature of 39K. The use of magnesium diboride wire enables the superconducting wire to operate at a higher operating temperature.

In a superconducting electrical machine according to the present invention there is a temperature margin of 14K, between 25K and 39K, and if there is a 1 W loss at 30K a cryogenic power input of 30 W is required. In a prior art low temperature superconducting electrical machine there is a temperature margin of 2K, between 4K and 6K, and if there is a 1 W loss at 4K a cryogenic power input of 1 KW is required. Thus it can be seen the present invention enables the use of a simpler cooling system and a considerable reduction on the impact on the radial air gap between the stator and the rotor enabling enhanced performance.

The provision of a smaller radial air gap between the stator and the rotor enables enhanced performance. There is a single stage cooling system. The stator assembly is in direct thermal contact and thus a heat capacity is provided which stabilises thermal transients and provides a reactive time in the event of a cooling system failure.

It may be possible to provide magnetic teeth or non-magnetic teeth on the stator.

In FIGS. 1 and 2 the stator is a conducting stator, e.g. a stator iron.

An alternative superconducting electrical machine 10, as shown in FIGS. 3 and 4 is substantially the same as the superconducting electrical machine shown in FIGS. 1 and 2 and like parts are shown by like numerals. The superconducting electrical machine in FIGS. 3 and 4 differs in that the stator 14 is a non conducting stator, e.g. an alumina stator. In addition an iron member 34 is placed around the vacuum enclosure 26 to form a shield around the superconducting electrical machine 10.

The invention claimed is:

1. A superconducting electrical machine comprising:
   a rotor;
   a stator, the stator having axial ends, a plurality of circumferentially spaced radially extending teeth, and a plurality of superconducting electric coils, each superconducting electric coil having end turns and being positioned around a respective one of the teeth;
   a thermally conducting member that surrounds and contacts the stator;
   a cooler arranged to cool the thermally conducting member;
   a vacuum enclosure that encloses the thermally conducting member, the stator and the superconducting electric coils;
   a pump to evacuate the vacuum enclosure; and
   a non-magnetic and thermally conducting support structure that supports the axial ends of the stator; wherein
      the superconducting electric coils consist of magnesium diboride, and
      the support structure provides mechanical support to and thermal cooling of the end turns of the superconducting electrical coils.

2. A superconducting electrical machine as claimed in claim 1 wherein a portion of the vacuum enclosure extends between the rotor and the stator.

3. A superconducting electrical machine as claimed in claim 1 wherein rotating vacuum seals are provided between the rotor and the vacuum enclosure.

4. A superconducting electrical machine as claimed in claim 1 wherein the support structure consists of alumina.

5. A superconducting electrical machine as claimed in claim 1 wherein the thermally conducting member consists of copper.

6. A superconducting electrical machine as claimed in claim 1 wherein the vacuum enclosure consists of non magnetic and non electrically conducting material.

7. A superconducting electrical machine as claimed in claim 1 wherein the cooler consists of a cryogenic cooling system having a cold head interface with the thermally conducting member.

8. A superconducting electrical machine as claimed in claim 1 wherein the thermally conducting member has passages extending therethrough and the cooler consists of a Stirling engine providing a flow of cryogenic cooling fluid through the passages in the thermally conducting member.

9. A superconducting electrical machine as claimed in claim 1 wherein the electrical machine is a permanent magnet electrical machine, a switched reluctance electrical machine or an induction machine.

10. A superconducting electrical machine as claimed in claim 1 wherein the stator consists of a stator iron.

11. A superconducting electrical machine as claimed in claim 1 wherein the stator consists of a non magnetic material.

12. A superconducting electrical machine as claimed in claim 11 wherein an iron member surrounds the vacuum enclosure.

13. A superconducting electrical machine comprising:
   a rotor;
   a stator, the stator having axial ends, a plurality of circumferentially spaced radially extending teeth, and a plurality of superconducting electric coils, each superconducting electric coil having end turns, and being positioned around a respective one of the teeth;
   a thermally conducting member that surrounds and contacts the stator;
   a cooler arranged to cool the thermally conducting member;
   a vacuum enclosure that encloses the thermally conducting member, the stator and the superconducting electric coils;
   a pump to evacuate the vacuum enclosure; and
   a non-magnetic and thermally conducting support structure that supports axial ends of the stator; wherein
      the stator includes a multiphase superconducting AC winding,
      the superconducting electric coils consist of magnesium diboride, and
      the support structure provides mechanical support to and thermal cooling of the end turns of the superconducting electrical coils.

14. A superconducting electrical machine comprising:
   a rotor;
   a stator, the stator having axial ends, a plurality of circumferentially spaced radially extending teeth, and a plurality of superconducting electric coils, each superconducting electric coil having end turns, and being positioned around a respective one of the teeth;
   a thermally conducting member that surrounds and contacts the stator;
   a cooler arranged to cool the thermally conducting member;

a vacuum enclosure that encloses the thermally conducting member, the stator and the superconducting electric coils;

a pump to evacuate the vacuum enclosure; and a non-magnetic and thermally conducting support structure that supports axial ends of the stator; wherein the stator includes a multiphase superconducting AC winding, the superconducting electric coils include magnesium diboride wires that are individually electrically insulated and potted in a cement, and the support structure provides mechanical support to and thermal cooling of the end turns of the superconducting electrical coils.

* * * * *